US009460202B2

(12) United States Patent
Yang et al.

(10) Patent No.: US 9,460,202 B2
(45) Date of Patent: Oct. 4, 2016

(54) APPARATUS, METHOD AND COMPUTER READABLE RECORDING MEDIUM FOR PROVIDING MUSIC RELATED INFORMATION BY RECOGNITION OF MUSIC OUTPUT THROUGH TELEVISION

(71) Applicant: NHN Corporation, Seongnam-si (KR)

(72) Inventors: Byoung Seok Yang, Seongnam-si (KR); Man Ho Won, Seongnam-si (KR); Sae Rin Kim, Seongnam-si (KR); Won Joon Choi, Seongnam-si (KR)

(73) Assignee: NHN Corporation, Gyeonggi-do (KR)

( * ) Notice: Subject to any disclaimer, the term of this patent is extended or adjusted under 35 U.S.C. 154(b) by 310 days.

(21) Appl. No.: 13/927,720

(22) Filed: Jun. 26, 2013

(65) Prior Publication Data

US 2014/0007171 A1    Jan. 2, 2014

(30) Foreign Application Priority Data

Jun. 27, 2012   (KR) ........................ 10-2012-0069253

(51) Int. Cl.
*H04N 7/173* (2011.01)
*G06F 17/30* (2006.01)

(52) U.S. Cl.
CPC .............. *G06F 17/30743* (2013.01)

(58) Field of Classification Search
CPC ................................................ H04N 21/8106
USPC ....................................................... 725/109
See application file for complete search history.

(56) References Cited

U.S. PATENT DOCUMENTS

| 2004/0260682 | A1* | 12/2004 | Herley et al. ...................... 707/3 |
| 2005/0160459 | A1* | 7/2005 | Mashimo et al. .............. 725/46 |
| 2008/0256115 | A1* | 10/2008 | Beletski et al. .............. 707/102 |
| 2009/0205000 | A1* | 8/2009 | Christensen et al. ........... 725/61 |
| 2011/0067115 | A1* | 3/2011 | Cappio et al. .................. 726/29 |
| 2012/0159557 | A1* | 6/2012 | Kim et al. ...................... 725/81 |

FOREIGN PATENT DOCUMENTS

KR    10-1132509    2/2012

* cited by examiner

*Primary Examiner* — Nasser Goodarzi
*Assistant Examiner* — Fred Peng
(74) *Attorney, Agent, or Firm* — Harness, Dickey & Pierce

(57) ABSTRACT

Disclosed herein is an apparatus and method for providing music related information by searching audio DNA information related to music output through, for example, a TV. The method including: receiving an audio DNA and broadcasting information of broadcasted music; identifying, using the music search server, the broadcasted music by determining whether the received broadcasting information matches music information and broadcast time of one of a plurality of broadcasting programs or advertisements, and comparing, when the determining fails to match the broadcasted music, the received audio DNA with audio DNA of the music pieces to identify the broadcasted music; searching detailed information on music identified by the audio DNA searcher; and transmitting the detailed information search result.

14 Claims, 12 Drawing Sheets

APPARATUS, METHOD AND COMPUTER READABLE RECORDING MEDIUM FOR PROVIDING MUSIC RELATED INFORMATION BY RECOGNITION OF MUSIC OUTPUT THROUGH TELEVISION

CROSS-REFERENCE TO RELATED APPLICATIONS

This application claims and priority from and the benefit of Korean Patent Application No. 10-2012-0069253, filed on Jun. 27, 2012, which is hereby incorporated by reference for all purposes as if fully set forth herein.

BACKGROUND

1. Field

The present description relates to an apparatus for providing music related information output through a broadcast, and more particularly, to an apparatus, a method, and a computer readable recording medium for providing music related information by recognition of is music output through a TeleVision (TV) providing the music related information, by searching audio DNA information related to music output through the TV in real time.

2. Discussion of the Background

With the recent development of technology, the TV provides an interactive function with a user and various additional services using the Internet in addition to a function of displaying only the received radio wave or cable broadcasting signals from the past.

Further, in order to receive digital broadcasting, an apparatus called a set top box (STX) as well as a mere TV is additionally required. The set top box is connected to the TV to receive a signal input from the outside, appropriately converts the received signal, and displays the contents of the converted signal on the TV. The set top box, which is a household communication terminal required to use a next-generation interactive multimedia communication service (so called interactive TV), such as, video on demand (VOD), home shopping, network games, and the like, is called a 'subscriber signal conversion apparatus' which may include a box lying on a TV set. The set top box is connected to the interactive TV or phone, a network for a video transmission service of a company, and the like, and the TV, and the like, in the home.

The set top box includes a function of receiving and converting a video signal as a basic function in addition to a function of communicating with a video server, and the like, which is installed in a phone company or a cable television system (CATV) operator. Further, in order to simultaneously use data communication services, such as, phone communication, PC communication, and the like, the set top box of various standards having a phone interface, an access interface with a personal computer (PC), and the like, has been reviewed. Therefore, in order to dominate an interactive TV market, manufacturers of communication devices, computers, and home appliances are competing for the commercialization and sale competition is of the set top box.

The set top box does not necessarily include a tuner. An apparatus transmitting an external signal to the set top box can include an Ethernet cable, a satellite receiving or terrestrial receiving antenna, a coaxial cable, a telephone line, an analog Very High Frequency (VHF) or an Ultra High Frequency (UHF) antenna, and the like. An example of contents received through the set top box may include video, audio, internet web pages, games, and the like.

As such, the TV may receive various information services as well as broadcasting information through the set top box interworking with the Internet and may select and control services through the interactive communication with a user. In order for a user to input a selected signal, a function of a remote controller needs to be variously expanded and there is a need to have a convenient interface.

The TV having the function of the set top box embedded therein may view the terrestrial broadcast and may be connected to the Internet to perform computer functions, such as, video-on-demand (VOD), games, video communication, application utilization, and the like. The general TV may also be connected to the set top box as described above to use the functions. As the TV replacement period is long, the TV and the set top box market have been developed together.

When general viewers want to know music related information output during the broadcast or advertisement through the TV, the user stores the music related information, such as, the words, and the like, they can search for the information by a personal PC, a smart phone, and the like. However, when music does not have words or is not be heard well by the viewers, it is impossible to search the music. Further, when viewers listen to only part of the words, it is is difficult to search the music information accurately.

One method for searching music related information from the output music in the prior art, provides music search results to audio data input from a mobile terminal. In this method, the searched music related information is displayed on a screen of a mobile terminal by receiving a broadcasting or advertising music output through the TV through a mike of the mobile terminal and allowing the mobile terminal to search the input music through a server.

However, the above-mentioned method needs to search the music data input through the mike of the mobile terminal, and the above-mentioned method requires a separate music recording process. As the above-mentioned method records the music data output through a speaker in the mobile terminal to search music, the prior art method may have a low recognition rate due to a difference between surrounding environment noise and a sound volume level of the music data.

Therefore, a need exists for a method for effectively searching music output during the broadcast or advertisement and providing the information related thereto.

SUMMARY OF THE INVENTION

The present description has proposed to solve the problems of the related art as described above.

Additional features of the invention will be set forth in the description that follows, and in part will be apparent from the description, or may be learned by practice of the invention.

The present description provides a system, an apparatus, a method, and a computer readable recording medium for providing music related information by recognition of is music output through the TV capable of extracting an audio signal from a broadcasting signal output through the TV and identifying the corresponding music from a server based on audio DNA of the extracted audio signal to provide the related information.

The present description provides a system, an apparatus, a method, and a computer readable recording medium for providing music related information by recognition of music output through the TV capable of identifying music included in broadcast currently output through the TV by using broadcasting related information collected in a server.

The present description provides a system, an apparatus, a method, and a computer readable recording medium for providing music related information by recognition of music output through the TV by searching an audio DNA of advertising music stored in a server when the music currently output through the TV is the advertising music.

The present description provides a system, an apparatus, a method, and a computer readable recording medium for providing music related information by recognition of music output through the TV by extracting an audio signal from a broadcasting signal output through the TV, identifying the corresponding music from a server based on an audio DNA of the extracted audio signal, and providing a target advertisement related to the identified music.

As described above, a characteristic configuration of present invention is as follows for achieving the above objects of the present invention and specific effects of the present invention.

According to exemplary embodiments of the present invention, there is provided a music search server including: a database configured to store music information and broadcast time for broadcasting programs, music information and a broadcast time for advertisements, and audio DNA and detailed information of music pieces; an information request receiver configured is to receive at least one of audio DNA of broadcasted music and broadcasting information; an audio DNA searcher including: a broadcasting information inquiry device configured to identify the broadcasted music based on whether the received broadcasting information matches music information and broadcast time of one of the broadcasting programs stored in the database, an advertisement information inquiry device configured to identify the broadcasted music based on whether the received broadcasting information matches music information and broadcast time used for one of the advertisements stored in the database, and an audio information inquiry device configured to compare the received audio DNA with audio DNAs of the music pieces stored in the database to identify the broadcasted music; a music information inquiry device configured to locate detailed information on the music identified by the audio DNA searcher; and a result information transmitter configured to transmit the detailed information, wherein the audio DNA searcher is configured to utilize the audio information inquiry device when the broadcasting information inquiry device and the advertisement information inquiry device fail to match the broadcasted music.

According to exemplary embodiments of the present invention, there is provided a method for providing music related information by recognition of music by a music search server, the method including: receiving an audio DNA and broadcasting information of broadcasted music; identifying, using the music search server, the broadcasted music by determining whether the received broadcasting information matches music information and broadcast time of one of a plurality of broadcasting programs or advertisements, and comparing, when the determining fails to match the broadcasted music, the received audio DNA with audio DNA of the music pieces to identify the broadcasted music; searching detailed information on music identified by the audio DNA searcher; and transmitting the detailed information search is result.

The information receiving the music related information by recognition of music output through the TV may be stored in a server computer readable recording medium. The recording medium may include all kinds of recording media in which a program and data are stored to be readable by a computer system. The recording medium may include a read only memory (ROM), a random access memory (RAM), a compact disk (CD), a digital video disk (DVD) ROM, a magnetic tape, a floppy disk, an optical data storage, or the like, and a medium implemented in a form of a carrier wave (for example, transmission through the Internet). In addition, the recording medium may be distributed in a computer system connected by a network, such that a computer readable code may be stored and executed in a distributed scheme.

BRIEF DESCRIPTION OF THE DRAWINGS

The above and other objects, features and advantages of the present disclosure will become apparent from the following description of certain exemplary embodiments given in conjunction with the accompanying drawings. The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

Figure 1:
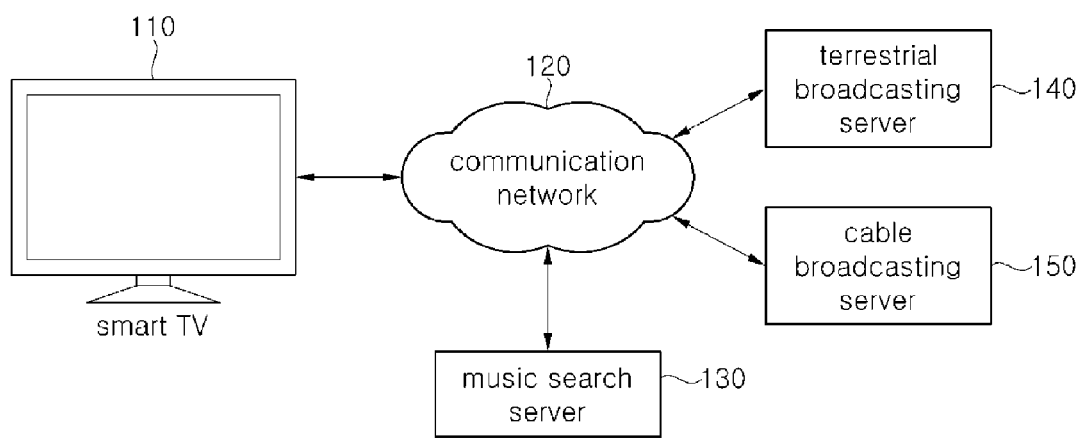
FIG. 1 is a diagram illustrating a system for providing music related information by recognition of music output through the TV according to exemplary embodiments of the present invention.

The invention is described more fully hereinafter with reference to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. It will be understood that for the purposes of this disclosure, "at least one of X, Y, and Z" can be construed as X only, Y only, Z only, or any combination of two or more items X, Y, and Z (e.g., XYZ, XZ, XYY, YZ, ZZ). Throughout the drawings and the detailed description, unless otherwise described, the same drawing reference numerals are understood to refer to the same elements, features, and structures. The relative size and depiction of these elements may be exaggerated for clarity.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first", "second", and the like does not imply any particular order, but they are included to identify individual elements. Moreover, the use of the terms first, second, etc. does not denote any order or importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Although some features may be described with respect to individual exemplary embodiments, aspects need not be limited thereto such that features from one or more exemplary embodiments may be combinable with other features from one or more exemplary embodiments.

In addition, embodiments described in the specification are wholly hardware, and may be partially software or wholly software. In the specification, "unit", "module", "device", "system", or the like represents a computer related entity such as, hardware, combination of hardware and software, or software. For example, in the specification, the unit, the module, the device, the system, or the like may be an executed process, a processor, an object, an executable file, a thread of execution, a program, and/or a computer, but are not limited thereto. For example, both of an application which is being executed in the computer and a computer may correspond to the unit, the module, the device, the system, or the like in the specification.

Hereinafter, exemplary embodiments of the present invention will be described in detail with reference to the accompanying drawings.

Exemplary embodiments of the present invention disclose a system and a method for extracting an audio signal from a broadcasting signal output through the TV and identifying the corresponding music from a server based on an audio DNA of the extracted audio signal to provide related information. The audio signal does not use a signal output through a speaker; rather, it uses an audio signal directly fetched or retrieved through an application programming interface (API) of the TV or an audio signal separated from buffered video information, such that is the audio signal may be extracted more accurately.

The audio DNA of the extracted audio signal that is currently being broadcasted is extracted. The extracted DNA is transmitted to a server, for example, a music search server, through the Internet. The music search server searches matched music information from a database based on the transmitted audio DNA to identify music.

According to the exemplary embodiments of the present invention, music is identified by referring to an existing recognized result or broadcasting information which is pre-stored in a server in a cache type, such that the music may be identified without a search operation based on the audio DNA. For example, the TV may transmit the broadcasting information (for example, channel information) together with the audio DNA information and the server may use the broadcasting information and broadcasting time information to perform the music identification using the broadcasting information, prior to performing the music identification based on the audio DNA search. By doing so, it is possible to reduce the search time and a computation load of the server and more accurately obtain the searched result. Further, according to this description, after the server collects the audio DNA of the advertising channel, when the music is the music output during the advertisement, the recognition efficiency can be increased by first recognizing the received audio DNA based on the audio DNA of the advertising channel.

Music identification or music recognition is a technology of finding out inherent feature elements of music or audio, that is, the audio DNA, like human fingerprints to recognize music and providing music information, such as, a title, a singer, a composer, a conductor, an album name, and the like. The audio DNA may be considered as a kind of audio fingerprinting. The audio DNA is called various terms, such as, a feature vector, and the like. Audio DNA is a is feature used to differentiate the audio, like an inherent fingerprint or DNA. As such, the audio DNA used for music recognition is classified into a process of sampling audio for a predetermined time and a process of extracting a feature from the sampled audio.

The sampling process is a process of sampling and recording an audio signal at a constant frequency, such as, 44.1 kHz, and the like, for a predetermined time, such as, 10 seconds, and the like. Further, the process of extracting a feature of audio includes a process of performing various kinds of signal processing, such as, filtering, wave conversion, amplification, attenuation, and the like, on the sampled audio in a time or frequency space.

Therefore, music is searched by comparing the audio DNA with the audio DNA stored in a database server. That is, the database server stores the music information and the audio DNA information and receives the audio DNA of music currently being broadcast and provides the music information corresponding thereto.

The present description can be applied to the 'TV' having any type, shape, and function as described below. The present description can be applied to a smart TV including an application installed therein and a communication function with the Internet for example. The present description can be applied to a system where an integrated set top box is connected to a general TV, and the general TV and the integrated set top box, providing exemplary embodiments of the present invention, together provide the functionality of a smart TV. As such, a smart TV device is either a television set with integrated Internet capabilities or a general television set connected to a set-top box for television that offers more advanced computing ability and connectivity than a basic general television set. A smart TV includes a computer system, usually from a handheld computer, integrated within a television set unit, and as such, a smart TV often allows the user to install and run more advanced applications or plugins/add-ons is based on a specific platform. A smart TV runs a complete operating system or mobile operating system software providing a platform for application developers. Further, in the following description, the smart TV will be described as an example to help the understanding of the present invention, but the present invention is not limited to the smart TV and can be applied to any type of TV having an application installed therein to provide a network communication function.

Further, in the following description, the 'broadcasting signal' is a concept including the video signal and the audio signal received through the TV or the set top box, and the present description may include any broadcasting signal, such as, a terrestrial broadcasting signal, a cable broadcasting signal, a satellite broadcasting signal, an IPTV broadcasting signal, and the like. In this case, included in the broadcasting signal includes data obtained by converting various types of sound, such as, speech, audio, music, and the like, into electrical signals. The audio signal may be transmitted or received, be included in the video signal of the broadcasting signal or may be transmitted or received as a separate signal.

Further, in the following description, the 'audio DNA', which is the extraction information of the feature elements of music for music identification as described above, may be generated by performing the signal processing on the music signal by various methods and the method for generating an audio DNA according to exemplary embodiments of the present invention is not limited to a specific method.

Further, in the following description, the 'music related information' includes metadata for music and target advertising information related to music. The metadata for music may include various forms, such as, a music title, a musician name, an album name, a music list included in an album, a music genre, an album picture, and the like. An ID3 tag is a standard is used mainly for a compressed audio file, such as, mp3, and the like and may include an ID3v1 tag or an ID3v2 tag. The ID3v1 tag is annexed with the information, such as, track/title/artist/album name/genre/detailed information, and the like and the ID3v2 tag is annexed with information, such as, composer, words, original artist, copyright holder, URL, person performing encoding, and the like.

The metadata in the music related information according to the exemplary embodiments of the present invention may be in a form defined by the standard, such as, the ID3 tag, and may also be an individually defined form, separately therefrom. In addition, the target advertisement related to music may include a previously established advertisement to increase an advertising effect in consideration of a gender preferring the corresponding music, an age group, a genre, a taste, and the like. That is, in the following description, the 'target advertisement' is the specific information or the advertising information related to a specific user group, and in the present description, the advertising information related to the identified music information is called the target advertisement.

Hereinafter, exemplary embodiments of the present invention will be described in detail with reference to the accompanying drawings so that those skilled in the art may easily implement the spirit of the present invention.

Structures of a system and an apparatus according to exemplary embodiments of the present invention will first be described with reference to FIG. 1, FIG. 2, FIG. 3 and FIG. 4 and then a procedure according to exemplary embodiments of the present invention will be described in detail with reference to FIG. 5, FIG. 6, FIG. 7 and FIG. 8.

System for Providing Music Related Information

FIG. 1 is a diagram illustrating a system for providing music related information by recognition of music output through the TV according to exemplary embodiments of the present invention. Referring to FIG. 1, a system according to exemplary embodiments of the present invention may be configured to include a smart TV 110, a communication network 120, a music search server 130, a terrestrial broadcasting server 140, a cable broadcasting server 150, and the like.

The TV may be the smart TV 110 connected to the communication network 120 and may have applications that may be executed installed therein. The smart TV 110 may be implemented in a form in which the set top box is connected to the general TV as described above. When a set top box is used with a general TV, the description below associated with the smart TV is also applicable to the set top box and the like.

The smart TV 110 receives a broadcasting signal from the terrestrial broadcasting server 140 and/or the cable broadcasting server 150 to display the broadcasting information of the specific channel selected by a user. The smart TV 100 may directly receive the broadcasting signal. In some embodiments, the smart TV 100 may also receive the broadcasting signal through the set top box (STB) (not shown) connected to the general TV. For example, the STB may receive the broadcasting signal from the terrestrial broadcasting server 140 or the cable broadcasting server 150 and provide the received broadcasting signal to the TV. In this case, the STB is connected to the communication network 120 by including an internet connection function to communicate with the music search server 130. Further, the STB may provide the functions according to the exemplary embodiments of the present invention by installing separate and/or dedicated applications.

According to the exemplary embodiments of the present invention, when requesting the search for information regarding the music currently being broadcasted by is executing the application installed in the smart TV 110, the application may collect the audio signal in the information which is currently being broadcasted through the smart TV 110 and perform the signal processing on the collected audio signal (for example, audio) to extract the audio DNA. As such, the extracted audio DNA information is transmitted to the music search server 130 through the communication network 120 from the smart TV 110. For searching music according to the exemplary embodiments of the present invention, the audio DNA information and the broadcasting related information, for example, broadcasting channel information, broadcasting time information, and the like, may be transmitted.

The music search server 130 receiving the audio DNA information on the audio signal from the smart TV 110 or the set top box identifies music by various methods according to the exemplary embodiments of the present invention. For example, according to the exemplary embodiments of the present invention, the music may be identified by comparing the music with the audio DNA information stored in the database, identified by using the pre-stored broadcasting schedule information, and identified by comparing the audio DNAs for advertisement.

The music search server 130 searches the related information, for example, metadata, target advertisement, and the like for the identified music and provides the searched information to the smart TV 110.

The communication network 120 may be configured regardless of communication aspects, such as, wired communication and wireless communication, and may be various communication networks, such as, a personal area network (PAN), a local area network (LAN), a metropolitan area network (MAN), a wide area network (WAN), and the like. In addition, the communication network 120 may be the known World Wide Web (www) and may use a is wireless transmission technology used in short range communications, such as, infrared data association (IrDA), Bluetooth, and the like. Further, the communication network 120 may include a cable broadcasting communication network, a terrestrial broadcasting communication network, a satellite broadcasting communication network, and the like, through which the smart TV 110 receives the broadcasting signal.

Hereinafter, the detailed structures of the smart TV 110 and the music search server 130 will be described with reference to FIG. 2, FIG. 3, and FIG. 4.

Figure 2:
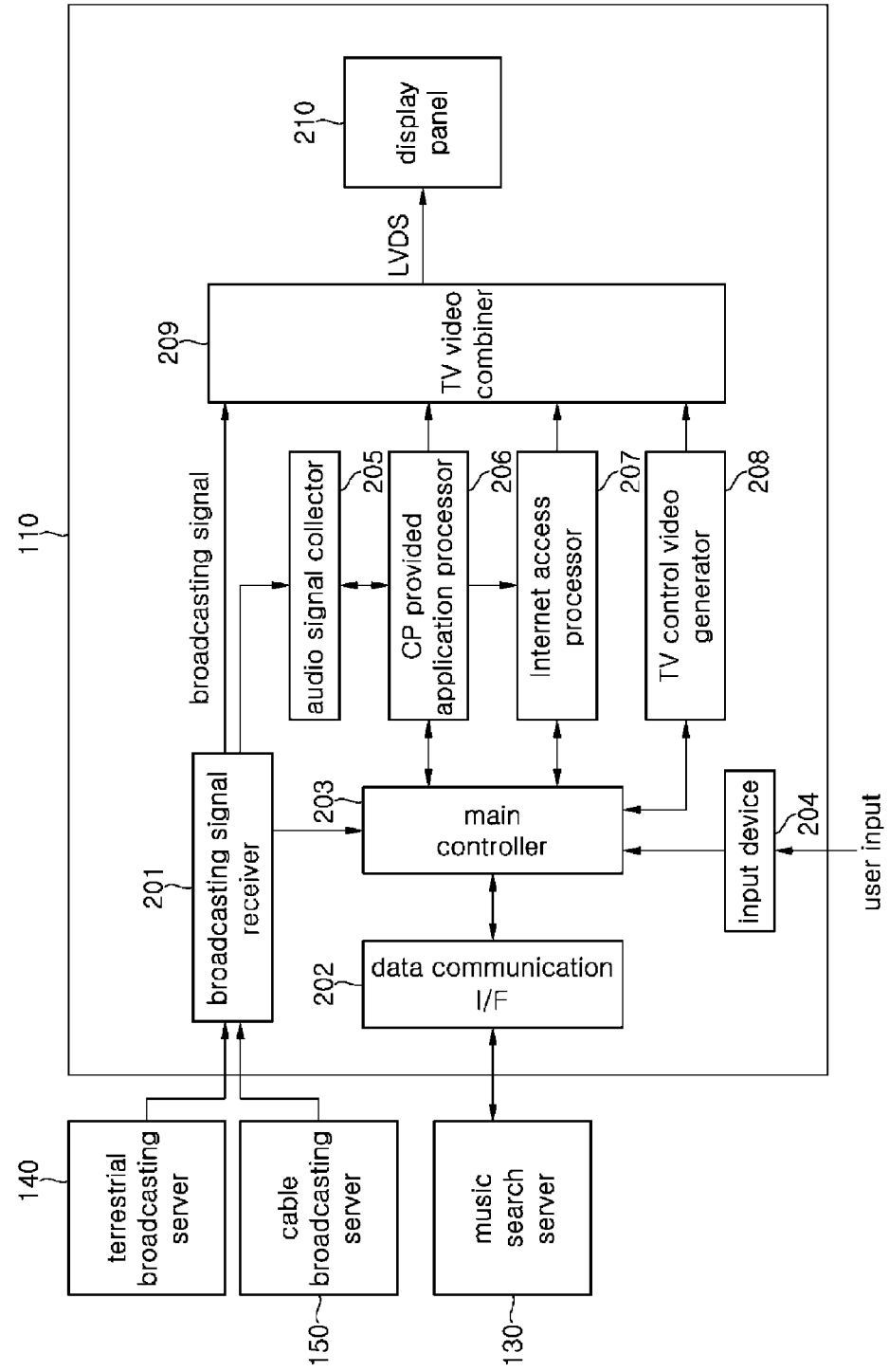
FIG. 2 is a block diagram illustrating a structure of the TV according to exemplary embodiments of the present invention.

FIG. 2 is a block diagram illustrating a structure of the TV according to the exemplary embodiments of the present invention. Referring to FIG. 2, the smart TV 110 according to the exemplary embodiments of the present invention may be configured to include a broadcasting signal receiver 201, a data communication interface (UF) 202, a main controller 203, an input device 204, an audio signal collector 205, a Content Provider (CP) provided application processor 206, an internet access processor 207, a TV control video generator 208, a TV video combiner 209, a display panel 210, and the like.

The broadcasting signal receiver 201 receives various broadcasting data transmitted from the outside and performs, for example, functions of receiving a terrestrial broadcasting signal, a cable broadcasting signal, an IPTV broadcasting signal, a satellite broadcasting signal, and the like. For example, a cable TV receiver in the broadcasting signal receiver 201 performs demodulation on the cable TV signal. In this case, the demodulated data is configured of compressed video, audio, and additional information. The compressed video is decompressed according to, for example, the MPEGx/H.264 standard so as to be generated as a video raw data. The compressed audio is decompressed according to the MPEGx/H.264 to be generated as audio raw data. In addition, the additional information is transmitted to the main is controller 203. The received broadcasting signal is transmitted to the display panel 210 through the TV video combiner 209. In the broadcasting signal receiver 201, data obtained by allowing the IPTV receiver to demodulate the IPTV signal is the IPTV data received through the Internet and is configured of the compressed video, audio, and additional information. In this case, similar to the cable TV receiver, the compressed video is decompressed according to, for example, the MPEGx/H.264 standard and is generated as the video raw data. The compressed audio is decompressed according to the MPEGx/AC3/AAC standard to be generated as audio raw data. In addition, the additional information is transmitted to the main controller 203.

The data communication I/F 202 is a data communication channel performing data communication independent of the receiving of TV broadcasting contents received in the broadcasting signal receiver 201 and performs the data communication with the music search server 130 through the communication network 120 according to the exemplary embodiments of the present invention.

According to the exemplary embodiments of the present invention, the main controller 203 performs a main control function of the smart TV 110 for supporting a function of searching music and a function of providing music related information based on the music search server 130. That is, the music related information providing service is provided through the information exchange with the music search server 130 through the internet access. In addition, when a user inputs the selection signal for searching music through the input device 204, the corresponding application is executed by controlling the CP provided application processor 206. Further, the main controller 203 controls a TV channel change, a TV setting change, such as, an audio control, and the like, controls the internet access, and controls application programs provided by a Content Provider (CP), such as, 'T-commerce'.

The audio signal collector 205 performs a function of collecting audio signals from various broadcasting signals received through the broadcasting signal receiver 201 in response to the audio information request of the CP provided application processor 206.

Generally, the signals used within the TV may be classified into four signals according to a level of the signal. The signal having the lowest level is RF (referred to as radio frequency or HF (high frequency)) incoming into a TV antenna line and one line includes a signal in which the video and the audio are mixed, and a circuit in the TV separates signals of each of the Red (R), Green (G), and Blue (B) for directly displaying video on the screen and the audio signal from one signal. The cable broadcast or the radio wave broadcasting viewed in the general home is received in the RF signal format.

The signal having a higher level than the RF signal is a Composite Video Banking Sync (CVBS which is often referred to as a video signal) signal, which is a video signal in which color difference, luminance, and sync are mixed in one signal line and the audio signals (that is, speech signals) are excluded. As the signal is commonly input and output through a yellow terminal called video output and video input, it is possible to transmit the video signal through one line.

The signal having a higher level than the CVBS is a Y/C or Y/P signal, in which luminance and sync are mixed and a signal from which a color difference is separated. Y, Pb, and Pr, or Y, Cb, and Cr component terminals of the TV or the video are used to transmit and receive Y/C and Y/P signals. Further, the signal having a higher level than the Y/C and the Y/P is the RGB signal and the R, G, and B are each separated and the sync signal is separated, thereby representing the best quality of image.

That is, the audio signal collector 205 performs a function of collecting a speech is signal (that is, audio signal) meeting the corresponding signal format, among the broadcasting signals received in various forms as described above.

When the internet access processor 207 performs the internet access with the music search server 130 according to the execution of application programs according to the exemplary embodiments of the present invention, the internet access processor 207 performs a function of controlling the internet access. Separately from the TV display region, an internet display region is generated on the screen of the TV 110 through the internet access processor 207 to provide various types of information (for example, music search application progress information, various types of music related information as music search results, and the like).

The CP provided application processor 206 executes the music search program executed by the music search server 130 according to the exemplary embodiments of the present invention. For example, as the user requests the search for information regarding the music that is currently being broadcasted, the CP provided application processor 206 collects the audio signal, extracts the audio DNA from the collected audio signal, and transmits the extracted audio DNA to the music search server 130. Further, the CP provided application processor 206 displays the searched result information received from the music search server 130 on the screen through the display panel 210.

The TV control video generator 208 may generate a separate control display region for TV channel change, sound volume control, setting change, and the like, on the screen of the TV 110.

The TV video combiner 209 combines each display region provided through the broadcasting signal receiver 201, the internet access processor 207, the CP provided application processor 206, and the TV control video generator 208 in the form set by the user to generate the TV display region. That is, the TV display region is provided by being divided into, for example, the TV display region, the internet display region, a CP display region, a control display region, and the like or may be generated by partially overlapping each region. In this case, as the combined form of the respective display regions, the display screen for TV output may be generated by making each display region independently, have different scales according to the user preference, or the TV display screen may be generated by transparently or translucently processing the specific display region.

Hereinafter, the detailed structure of the CP provided application processor 206 will be described with reference to FIG. 3.

Content Provider (CP) Provided Application Processor (Smart TV Application)

Figure 3:
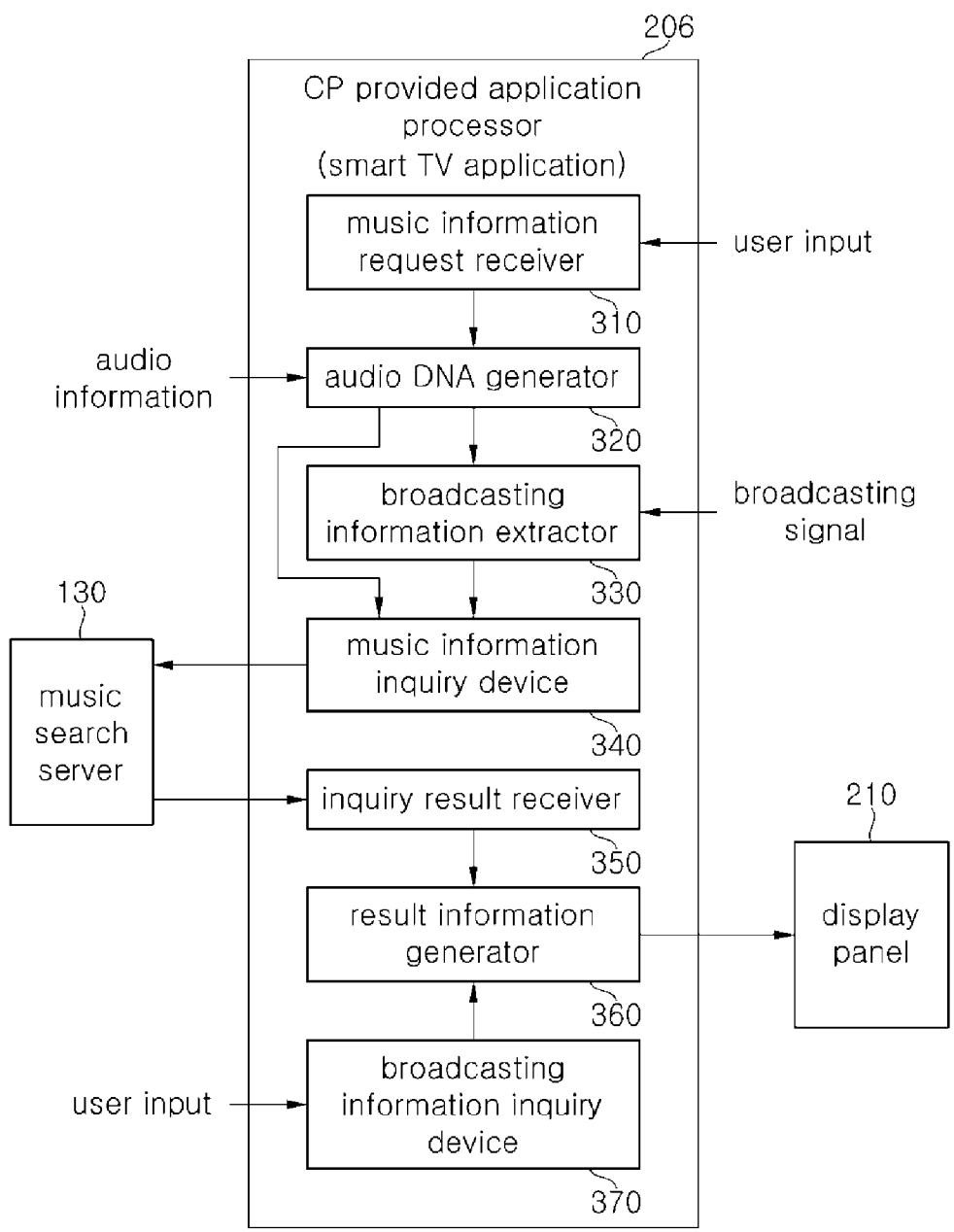
FIG. 3 is a block diagram illustrating a function of an application installed in the TV according to exemplary embodiments of the present invention.

FIG. 3 is a block diagram illustrating a detailed function of an application that is installed in the TV according to the exemplary embodiments of the present invention. The application installed in the smart TV 110 according to the exemplary embodiments of the present invention may be configured to include a music information request receiver 310, an audio DNA generator 320, a broadcasting information extractor 330, a music information inquiry device 350, an inquired result receiver 350, a result information generator 360, a broadcasting information inquiry device 370, and the like.

The music information request receiver 310 receives the music information request signal input from the user and performs a function of driving the application. According to the driving of the application, the audio DNA generator 320 performs the signal processing on the audio signal collected through the audio signal collector 205 of FIG. 2 by a preset method to generate the audio DNA. A method for generating the audio DNA may be variously implemented and the detailed description thereof will be described below.

The broadcasting information extractor 330 extracts various types of broadcasting information from the broadcasting signal received through the broadcasting signal receiver 201, the Internet, and the like. Further, the broadcasting information extractor 330 collects the channel information currently set in the TV.

The music information inquiry device 340 transmits the audio DNA information of music, which is generated through the audio DNA generator 320 and is currently being broadcasted, to the music search server 130 to perform a function of requesting the music search. According to the exemplary embodiments of the present invention, the music information inquiry device 340 may also transmit the broadcasting information extracted through the broadcasting information extractor 330.

Thereafter, the music search server 130 identifies the music, which is being broadcasted, based on the transmitted audio DNA information or broadcasting information and transmits the corresponding music related information to the TV 110.

In this case, the inquired result receiver 350 of the TV 110 receives the music related information from the music search server 130 and the result information generator 360 edits the received information to generate the information to be displayed on the screen.

According to the exemplary embodiments of the present invention, the broadcasting information inquiry device 370 inquires the broadcasting information on the corresponding searched music by the input of the broadcasting information inquiry request signal of the user and displays the inquired result on the screen through the display panel 210.

Example of Method for Generating Audio DNA

Hereinafter, an example of the method for generating an audio DNA using the audio DNA generator 320 will be described. The present invention is not limited to the is foregoing embodiments and may generate the audio DNA by various methods.

In order to generate the audio DNA, first the audio signal is stored as a sample for a sample time (for example, 3 seconds) by a speech coder and an amplitude (dB) of the audio signal is measured. The sample may be stored by measuring the amplitude of the audio signal according to a frequency in a range, for example, between 300 Hz and 3 kHz over a sampling interval of, for example, every 11 millisecond (msec).

Next, among the audio signals according to the frequency, an audio signal having a specific amplitude, for example, 500 dB or more is amplified 10 times and an audio signal less than 500 db is attenuated, for example, 0.1 times, such that the amplitude of the audio signal may be stored at 256 time intervals. As the modulated result, the audio signal is converted in a form in which only the signal having the specific frequency is present in the selected sampling interval, for example, every 11 msec. The converted audio signal may be stored in, for example, an audio file form, such as, A.WAV. Therefore, the audio sample may be an audio signal amplified or attenuated from a frequency range between 300 Hz and 3 kHz in 256*11 msec in a unit of 11 msec.

According to the method for generating an audio DNA of a sample from the generated audio sample, first, the audio samples are divided into 33 frequency sections FI1 to FI33 by selecting only the frequency of 750 Hz to 2750 Hz. Next, the amplitudes of the audio signals are each stored in each frequency section. For example, depending on the following Equation 1, the amplitudes of the 256*33 audio signals corresponding to a product of 256 time intervals (unit time: 11 msec) and 33 frequency sections (unit frequency: 66 Hz) are stored.

$$\text{Amplitude of signal } [i,j]=[A_{i,j}] \qquad \text{[Equation 1]}$$

In the above Equation 1, i (natural number of $1 \leq i \leq 256$) represents the 256 time intervals and j (natural number of $1 \leq j \leq 256$) represents the 33 frequency sections.

In order to generate the audio DNA from the audio signal, depending on the following Equation 2, a difference in amplitudes of signals between adjacent frequencies of a specific time, for example, 11 msec, for example, between FI1 and FI2 is obtained. A difference in the amplitudes of the signals between FI2 and FI3, FI3 and FI4, . . . , FI32 and FI33 is obtained by the same method. The difference in the amplitudes of the signals between the adjacent frequency sections is obtained even in the next time 11*2 msec. The difference in the amplitudes of the signals is obtained up to 256*11 msec by the same method. Therefore, the difference value in the amplitudes of 256*32 signals is calculated.

Difference (i=1) in amplitude of signal=[A1,k]−[A1,k+1]    [Equation 2]

In the above Equation 2, k represents a natural number of 1 to 32.

Next, by calculating the difference between the obtained differences of the adjacent time intervals (hereinafter, referred to as a slope), for example, between the 11 msec and 11*2 msec based on the following Equation 3 again, when the slope is 0 or more, a value of "1" is stored and when the slope is less than 0, a value of "0" is stored. The process is performed over the entire time interval. When all the slopes are obtained and stored, 32*256 quantized binary values are stored. The quantized binary value is determined by the audio DNA of the sample.

Slope=([A1,k]−[A1,k+1])−([A2,k]−[A2,k+1])    [Equation 3]

In the above Equation 3, k represents a natural number of 1 to 32.

The method for generating an audio DNA of a sample in the music search server 130 may generate the audio DNA, like the method for generating an audio DNA of the audio DNA generator 320. Further, the method for generating an audio DNA in the music search server 130 or the audio DNA generator 320 of the smart TV 110 may also generate the audio DNA only for the set time (for example, 3 seconds) as described above and the music search server 130 may generate the audio DNA stored as a sample only for the set time and may generate the audio DNAs for all received audio information which is the search object.

In some embodiments, an input audio signal may be converted into an audio DNA signal configured of a pitch and a duration of each sound by extracting a pitch and a duration of sound from the input audio signal. In this case, the method for extracting the pitch and the duration of sound is as follows.

First, for convenience of signal processing, the input audio signal is normalized as a value between 0 and 1, and an average of the normalized value is corrected to be 0. Next, bandpass filtering for setting a range of an effective frequency range other than an unnecessary frequency domain, such as, a frequency range out of an audible region, and the like, is performed.

Next, musical characteristics are extracted by removing noise of the input audio signal. For example, spectral weighting may be used. Next, the input audio signal is separated in the overlapping frame unit. In this case, each frame is set to overlap each other in a predetermined section. The following procedure for the each separated frame may be performed.

First, for each frame, a starting point and an ending point of a section in which an effective sound other than noise is generated are obtained. The section of the effective signal is determined according to the amplitude of the signal and the amplitude A(k) of the signal of a k-th frame may be calculated depending on the following Equation 4.

$$A(k) = \sum_{n=1}^{N} |x_k(n)|$$    [Equation 4]

In the above Equation 4, N represents the number of samples within one frame.

In a method for dividing notes, when the value of the amplitude A(k) of the signal for the frame k is larger than a specific threshold value T(k), it is determined as the effective pitch and when the value is smaller than the specific threshold value T(k), it is determined as a silence section in which the effective data is not present. In the method for dividing notes, it is important to determine the threshold value T(k) and in order to dynamically obtain the T(k), a global threshold value $T_G$, a threshold value $T_N$ of background noise, and a local threshold value $T_L(k)$ obtained for a window having a size of 2W+1 in consideration of a frame by W before and after the frame k are used. The threshold value T(k) is obtained as follows.

(1) The global threshold $T_G$ is calculated depending on the following Equation 5.

$$T_G = \alpha \cdot \frac{1}{N_F} \cdot \sum_{n} A(n), \ \ 0 < \alpha < 1$$    [Equation 5]

In the above Equation 5, $N_F$ represents a total number of frames.

(2) The threshold value $T_N$ of background noise is calculated by the process using <Equation 6>.

$$T_N(i) = \frac{1}{N_N} \sum_{n=i}^{i+N_N-1} A(n)$$    [Equation 6]

$$T_{N\_min} = \{T_N(i) \mid T_N(i) \leq T_N(k)\}, \ \ \forall k$$

$$T_N = \min\left(\delta \cdot T_{N\_min}, \frac{1}{N_F} \cdot \sum_n A(n)\right), \ \ \delta > 1$$

(3) For k satisfying $1 \leq k \leq N_F$, the local threshold value $T_L(k)$ is obtained depending on the following Equation 7.

$$T_L(k) = \beta \cdot \frac{1}{2W+1} \cdot \sum_{n=k-W}^{k+W} A(n), \ \ 0 < \beta < 1$$    [Equation 7]

(4) Depending on the following Equation 8, the largest value among $T_G$, $T_N$, and $T_L(k)$ is set as the threshold value T(k) at the frame k.

$$T(k) = \max\{T_G, T_N, T_L(k)\}$$    [Equation 8]

In connection with whether the frame k is the effective information, when the A(k) is larger than the T(k), the information may be determined to be effective and when the A(k) is smaller than the T(k), the information may be determined not to be effective.

Pitch extracting process: a semitone value is determined by obtaining the pitches for each frame. In this case, as the method for extracting pitches, for example, an autocorrelation function (ACF) method for time domain analysis depending on the following Equation 9 may be used.

$$\text{semitone}(i) = 12 \times \log_2\left(\frac{\text{pitch}(i)}{440}\right) + 69 \qquad \text{[Equation 9]}$$

Smoothing process: smoothing is performed to analyze the semitone value.

Therefore, the value may be smoothed by applying a linear or non-linear filtering method. For example, the smoothing may be performed by median filtering, which is a non-linear filtering method.

Melody and beat determining process: a melody and a beat, which are inherent features of music, are extracted by using the smoothed data. The smoothed data has several pitch values within one divided effective sound section. In order to determine the melody and the beat from the smoothed data, when the obtained semitone value is in the effective section divided in the effective section dividing part, the semitone value is maintained originally and when the obtained semitone value is out of the effective section, the semitone value is set to be 0. That is, the semitone value has a value only in the effective section and the starting frame and the ending frame may be determined for each effective section. Each effective section is subjected to the following process to determine the melody and the beat.

(1) The section in which a difference between the semitone values is smaller than $\Delta$ is searched (in this case, $\Delta$ is $0 < \Delta < 1$).

(2) When the length of the section is smaller than a threshold value LS, the section is set as a stable section and when the length of the section is larger than the threshold value, the section is set as an unstable section. If the unstable section is disregarded, when the difference in the semitone values in the adjacent stable sections is smaller than 1, the two is sections are integrated. That is, the semitone value within the unstable section is readjusted to the semitone value within the stable section, such that the semitone value is incorporated in the integrated stable section.

(3) The length of the section is determined as a beat by determining the starting frame and the ending frame of the stable section within the effective section determined as described above.

(4) The semitone values are rounded off within the stable section and among these values, a value having the highest frequency is determined as a tune.

All the effective sections are sequentially subjected to the above (1) to (4) processes to determine the melody and the beat. A plurality of notes varying within the one effective sound section may be extracted by the above method.

The audio DNA of music may be generated by the above processing. The method for generating an audio DNA is described as an example to help the understanding of the present invention and the present invention is not limited thereto.

Music Search Server (Service Server)

Figure 4:
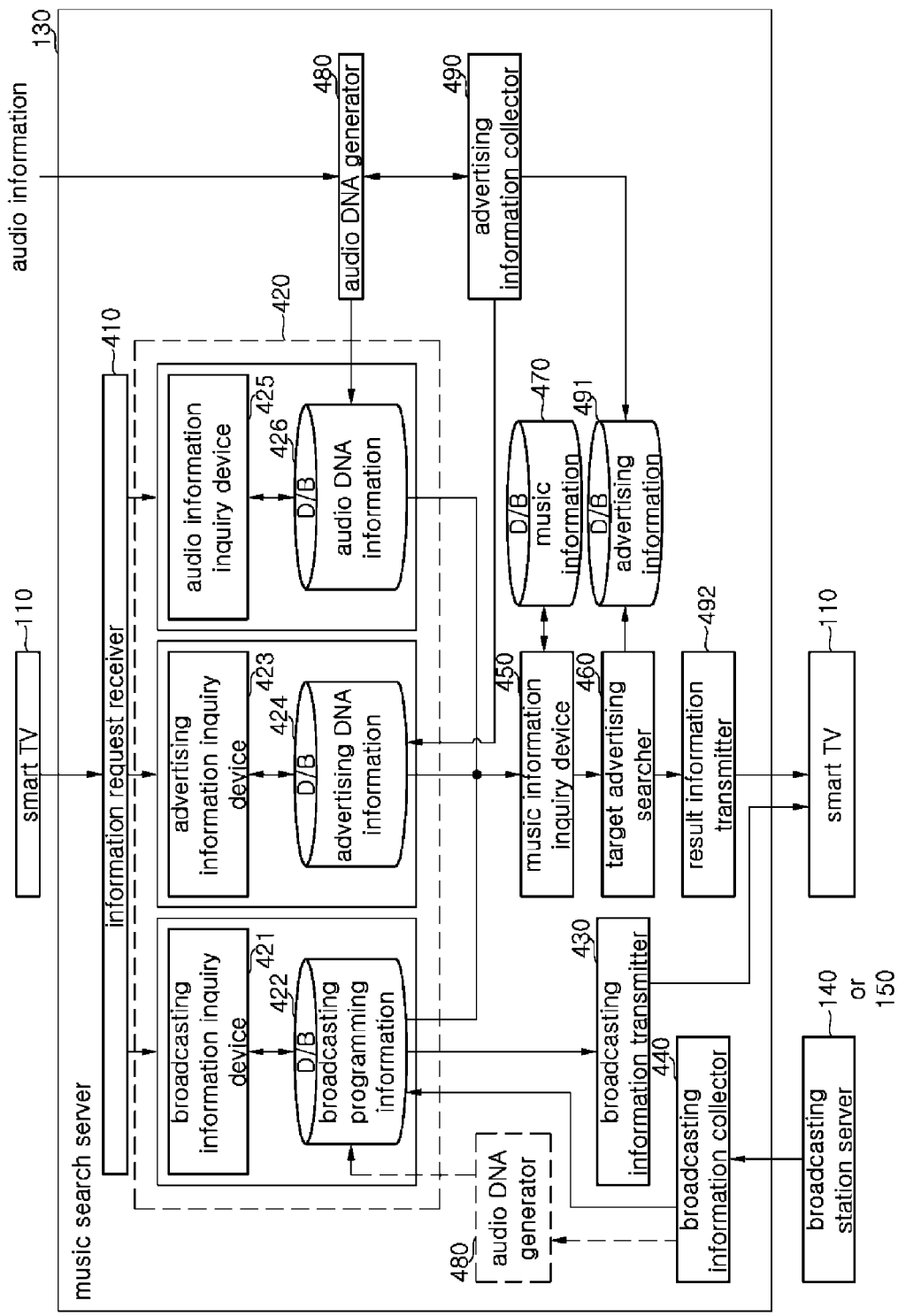
FIG. 4 is a block diagram illustrating a structure of a music search server according to exemplary embodiments of the present invention.

FIG. 4 is a block diagram illustrating a detailed function of a music search server according to exemplary embodiments of the present invention. Referring to FIG. 4, the music search server 130 according to the exemplary embodiments of the present invention may be configured to include an information request receiver 410, an audio DNA searcher 420, a broadcasting information transmitter 430, a broadcasting information collector 440, a music information inquiry device 450, a target advertising searcher 460, a music information database 470, an audio DNA generator 480, an advertising information collector 490, an advertising information database 491, a result information transmitter 492, and the like. Further, the audio DNA searcher 420 may be configured to include a broadcasting information inquiry device 421, an advertising information inquiry device 423, an audio information inquiry device 425, a broadcasting programming information database 422, an advertising DNA information database 424, and an audio DNA information database 426, depending on each search method.

Figure 8:
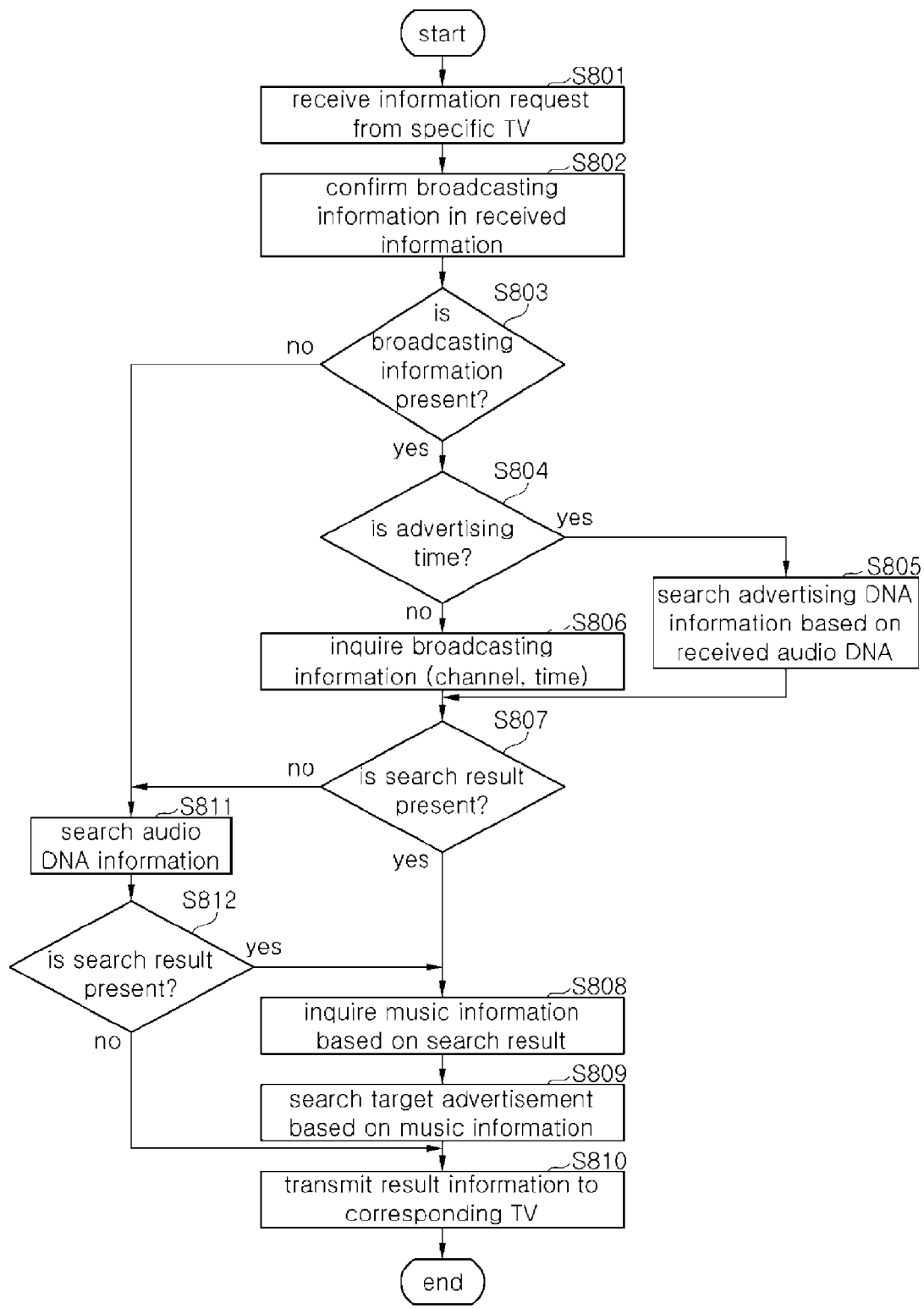
FIG. 8 is a flow chart illustrating a procedure of providing music related information of a music search server according to exemplary embodiments of the present invention.

First, the information request receiver 410 receives a request of a music search from the smart TV 110, the audio DNA searcher 420 searches music, for example, a procedure illustrated in FIG. 8, which is previously established as the audio DNA information and the broadcasting information received from the smart TV 110.

For example, the broadcasting information inquiry device 421 searches the broadcasting programming information stored in the broadcasting programming information database 422 from the received broadcasting information (for example, channel information and time information) and outputs the searched corresponding music information as the searched results. That is, the broadcasting programming information 422 includes the broadcasting programming information for each broadcasting channel and may include the music information included in each programmed broadcasting program and time information in which the corresponding music is broadcasted. Therefore, when the channel information and the time information are received from the smart TV 110, the music information for the program currently being broadcasted may be obtained by searching the information stored in the broadcasting programming information database 422.

As a result of inquiring the broadcasting programming information database 422, when the time is the advertising time between the specific programs, the advertising information inquiry device 423 may preferentially search the advertising music. That is, in the case in which the time when the music information is requested is the time when the advertisement is is broadcasted through the corresponding channel, since the music information is highly likely to be advertisement, the advertising information inquiry device 423 may search the audio DNA of the advertising music stored in the advertising DNA information database 424 to confirm the music information which is being broadcasted.

The advertising information collector 490 generates the audio DNA information for each advertisement audio used as the advertising music through the audio DNA generator 480 and stores the audio DNAs for each generated advertising audio in the advertising DNA information database 424. Further, the advertising information collector 490 may receive various types of advertising information to be provided to viewers and store the received advertising information in the advertising information database 491.

When the broadcasting information or the advertising information is not present for the audio DNA information received according to the information requested from the smart TV 110, the audio information inquiry device 425 compares the audio DNAs for each audio stored in the audio DNA information database 426 to search the music information. The method for searching music of the audio information inquiry device 425 may be variously implemented and may be implemented by comparing the received audio DNA information with the audio DNA information for each audio stored in the audio DNA information database 426 to search the most similar data.

For example, the method for searching music of the audio information inquiry device 425 may be implemented by the following method.

When the audio information inquiry device 425 receives the audio DNA information of music broadcast through the information request receiver 410 from the smart TV 110, the audio information inquiry device 425 extracts the music data including the audio DNA is signal of music from the audio DNA information database 426 stored as the musical DNA format for each audio.

The audio DNA generator 480 collects various music data (that is, audio data) and converts the collected data using the same method as the method for generating audio DNA information generated from the smart TV 110 to generate the audio DNA information for each audio and stores the generated audio DNA information in the audio DNA information database 426.

The audio information inquiry device 425 may search the audio DNA information database 426 to extract the music data including exactly the same audio DNA received and extract the music data having similarity. The similarity is determined to be high when the difference is within the set range by comparing the audio DNA information of the received music with the data within the audio information database 426.

As such, when the music is inquired and requested through the audio DNA searcher 420, the music information inquiry device 450 inquires the detailed information on the searched music through the music information database 470. In this case, the detailed information for each music piece is stored in the music information database 470. For example, the information stored in the music information database 470 is the metadata for music and may include various types of information, such as, a music title, a musician's name, an album name, a music list included in an album, a music genre, an album picture, and the like. Further, as described above, the information depending on ID3 tag, ID3v1 tag, ID3v2 tag, and the like, may be stored. The ID3v1 tag is annexed with the information, such as, track/title/artist/album name/genre/detailed information, and the like and the ID3v2 tag is annexed with information, such as, composer/words/original artist/copyright holder/URL/person performing encoding, and is the like. In addition, the additional information, such as, an address to which the reproducible audio data for the searched music may be downloaded, and the like, may be further provided.

According to the exemplary embodiments of the present invention, the target advertising searcher 460 searches the target advertisement related to music searched by the audio DNA searcher 420 based on the advertisement information database 491. As described above, the target advertisement related to music may include a previously established advertisement to increase an advertising effect in consideration of a gender preferring the corresponding music, an age group, a genre, a taste, and the like. That is, the target advertisement is the advertising information related to the specific information or the specific user group and any type of advertising information related to the identified music information may be the target advertisement according to the exemplary embodiments of the present invention.

The broadcasting information collector 440 may collect the broadcasting information (for example, broadcasting programming information, channel information, music information inserted during the broadcasting, and the like) from each broadcasting station server (for example, the terrestrial broadcasting server 140, the cable broadcasting server 150, and the like) and store the collected broadcasting information in the broadcasting programming information database 422. In this case, when the user requests the information search for the broadcasting schedule for the corresponding searched music (see FIG. 13), the broadcasting information transmitter 430 searches the broadcasting schedule information of the corresponding music stored in the broadcasting programming information database 422 and transmits the searched information to the smart TV 110. The broadcasting information may be information for a current broadcast or for a broadcast that was previously transmitted and recorded, for example, using a time shift device like a Digital Video Recorder (DVR). The DVR may be included in the is smart TV, in the set top box, or the like. In some embodiments, the broadcasting information can include the current time and channel. In some embodiments, the broadcasting information can include the time of the recorded broadcast and the channel when the broadcast was recorded.

The exemplary embodiments of the present invention illustrated in FIG. 2, FIG. 3 and FIG. 4 describe that the audio DNA generator 320 for converting the audio signal which is being broadcasted into the audio DNA signal is included in the smart TV 110, but for easiness of implementation, the audio DNA generator 320 may also be located in the music search server 130. That is, the smart TV 110 transmits the collected audio signal which is being broadcasted to the music search server 130 without generating the audio DNA and may allow the audio DNA generator (not illustrated) further included in the music search server 130 to generate the audio DNA information on the transmitted audio signal.

Further, according to exemplary embodiments of the present invention, the smart TV does not transmit the collected audio signal depending on the music information request which is being broadcasted and transmits only the broadcasting channel information and the time information and the music search server 130 may be implemented to search the information on music which is currently broadcasted only by the broadcasting channel information and the time information. For example, the music search server 130 may search and store the information on music being broadcasted in real time and may search the music information corresponding to the broadcasting channel information and the time information received from the smart TV 110 from the stored information.

As described above, the structures of the system and the apparatus according to the exemplary embodiments of the present invention will be described with reference to FIG. 1, FIG. 2, FIG. 3 and FIG. 4. Hereinafter, a procedure according to exemplary embodiments of the is present invention will be described in detail with reference to FIG. 5, FIG. 6, FIG. 7 and FIG. 8.

Method for Providing Music Related Information

Figure 5:
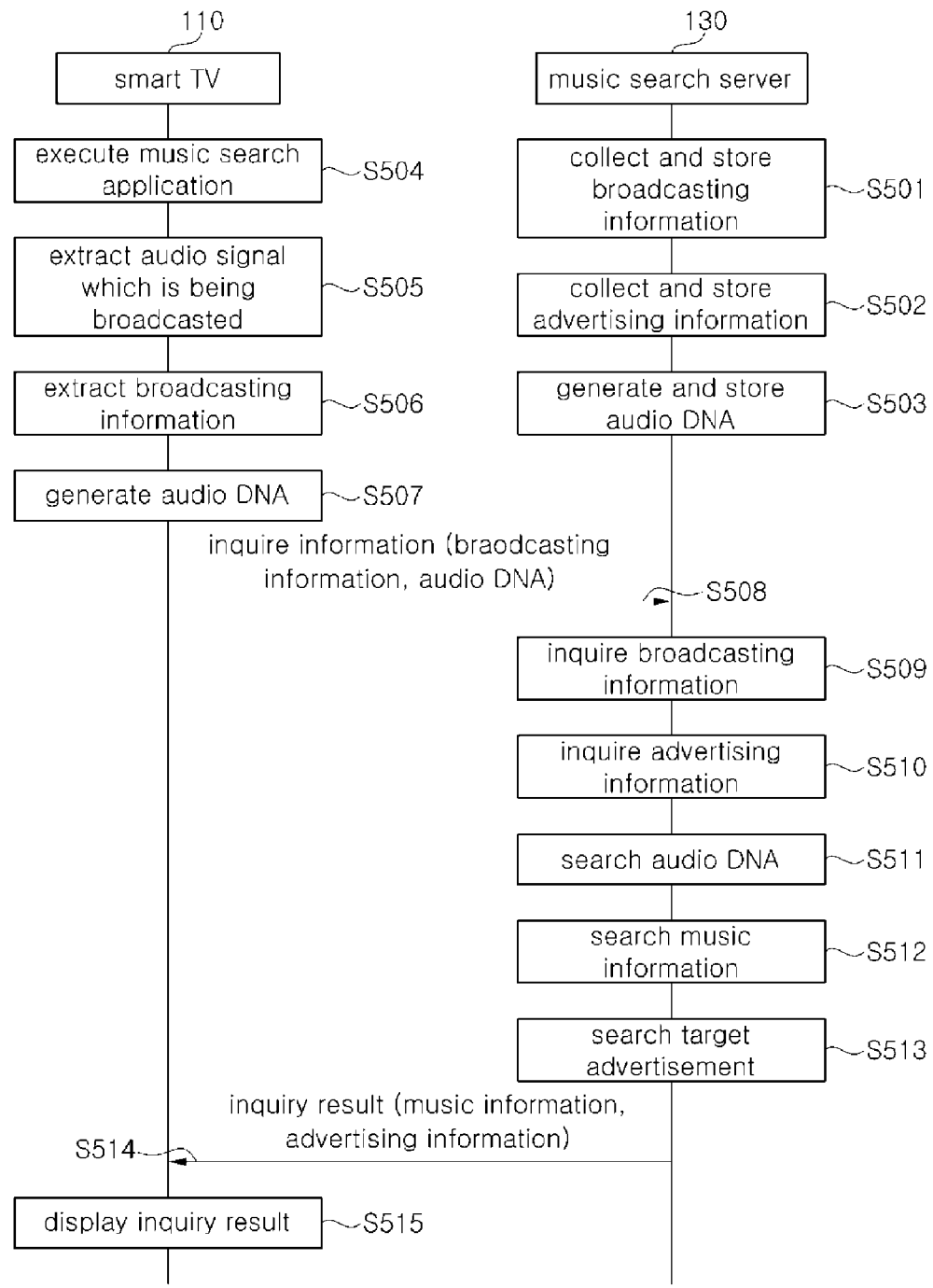
FIG. 5 is a signal flow chart illustrating a procedure for providing music related information by recognition of music output through the TV according to exemplary embodiments of the present invention.

FIG. 5 is a signal flow chart illustrating a procedure for providing music related information by recognition of music output through the TV according to exemplary embodiments of the present invention. Referring to FIG. 5, the music search server 130 collects the broadcasting information (for example, broadcasting programming information for each channel, music information inserted during the broadcasting, and the like) and stores the collected broadcasting information in the database (S501). Further, the music search server 130 collects the advertisement information (for example, audio information for each advertisement inserted into the broadcasting, broadcasting time information in which each advertisement for each channel is broadcasted, and the like) and stores the collected advertisement information in the database (S502). In this case, as described above, the audio information on the advertisement is generated as the audio DNA to be stored in the database (S503).

The smart TV 110 has the music search application installed therein to execute the application (S504) and requests the information on music that is currently being broadcasted. The smart TV 110 collects the audio signal in the data currently being broadcasted according to the request (S505) and generates the audio DNA from the collected audio signal (S507). In addition, at the time of selectively requesting the music information to the smart TV 110, the smart TV 110 extracts the broadcasting information (for example, broadcasting channel, broadcasting time, and the like) (S506). The smart TV can then request the information on music currently being broadcasted by transmitting the generated audio DNA information and/or broadcasting information to the music search server 130 (S508).

The music search server 130 inquires the broadcasting programming information is stored in the database from the transmitted broadcasting information according to the information request to search the corresponding music being broadcasted. In this case, as the result of inquiring the broadcasting programming information, when the time is the advertising time, the music search server first searches the audio DNA of advertising music.

As the searched results, when the corresponding music is not inquired in the broadcasting programming information and the advertising information, the music search server 130 compares the received audio DNA information with the pre-stored audio DNA information for each audio to search the music (S511).

The music search server 130 searches the music related information (for example, metadata) for the searched music according to the above-mentioned method (S512). Further, the music search server 130 selectively searches the target advertisement for the searched music (S513).

The searched music related information and target advertisement are transmitted to the smart TV 110 (S514) and the smart TV 110 displays the searched result on the screen by the music search application (S515).

Figure 6:
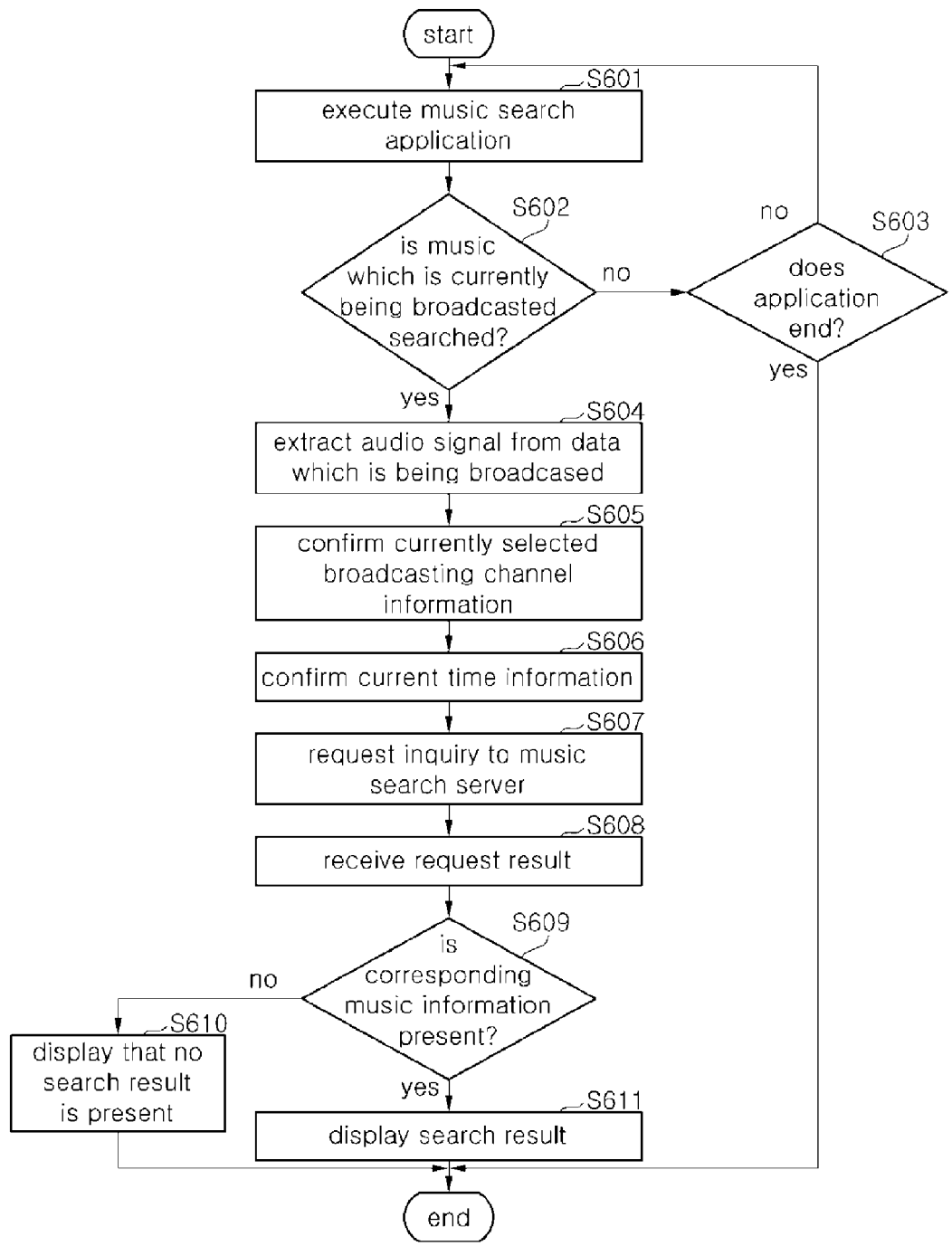
FIG. 6 is a flow chart illustrating a procedure of executing an application installed in the TV according to exemplary embodiments of the present invention.
Figure 11:
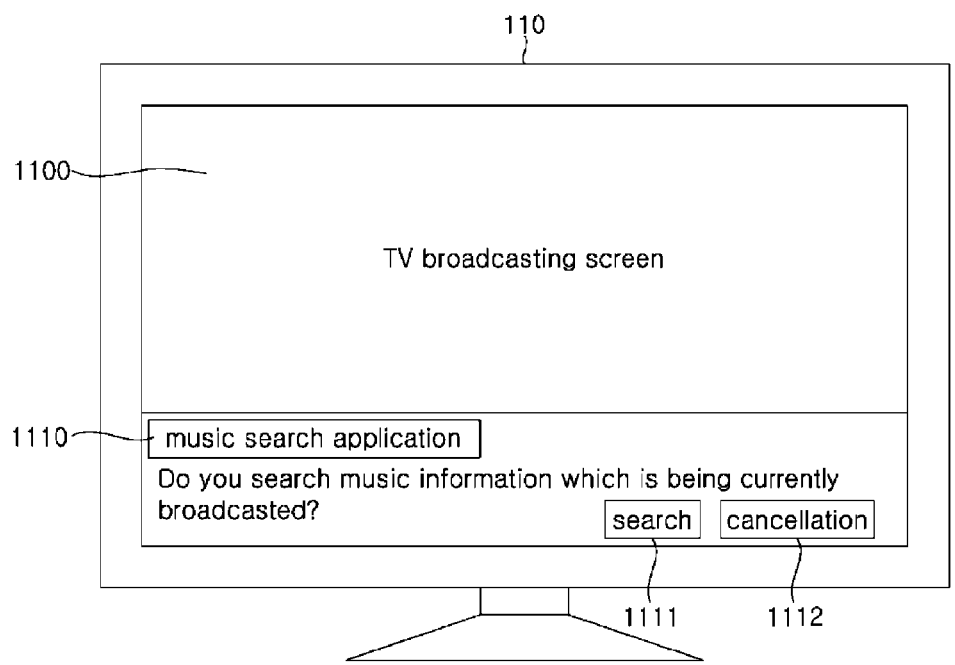
FIG. 11 is a diagram of a TV screen illustrating a music search application executing screen according to exemplary embodiments of the present invention.

FIG. 6 is a flow chart illustrating a procedure of executing an application installed in the TV according to exemplary embodiments of the present invention. Referring to FIG. 6, when the music search application installed in the smart TV is executed (S601), as illustrated in FIG. 11, a guide message inquiring whether to search the information on music currently being broadcasted is displayed. When the user does not select the search for music currently being broadcasted, for example, by using the TV remote controller, and the like (S602), and when the application ends (S603), the services end and only the TV broadcasting signal is displayed.

When the search for music currently being broadcasted is selected (S602), as is described above, the music search application extracts or collects the audio signal from the data being broadcasted (S604). Further, the application selectively confirms the information on the currently selected broadcasting channel (S605) and confirms the time information currently requesting the search (S606).

As such, when the confirmation is completed, the application requests the inquiry for the music currently being broadcasted, to the music search server (S607). When the inquiry to the music search server is completed, the corresponding music information is received (S608).

Figure 12:
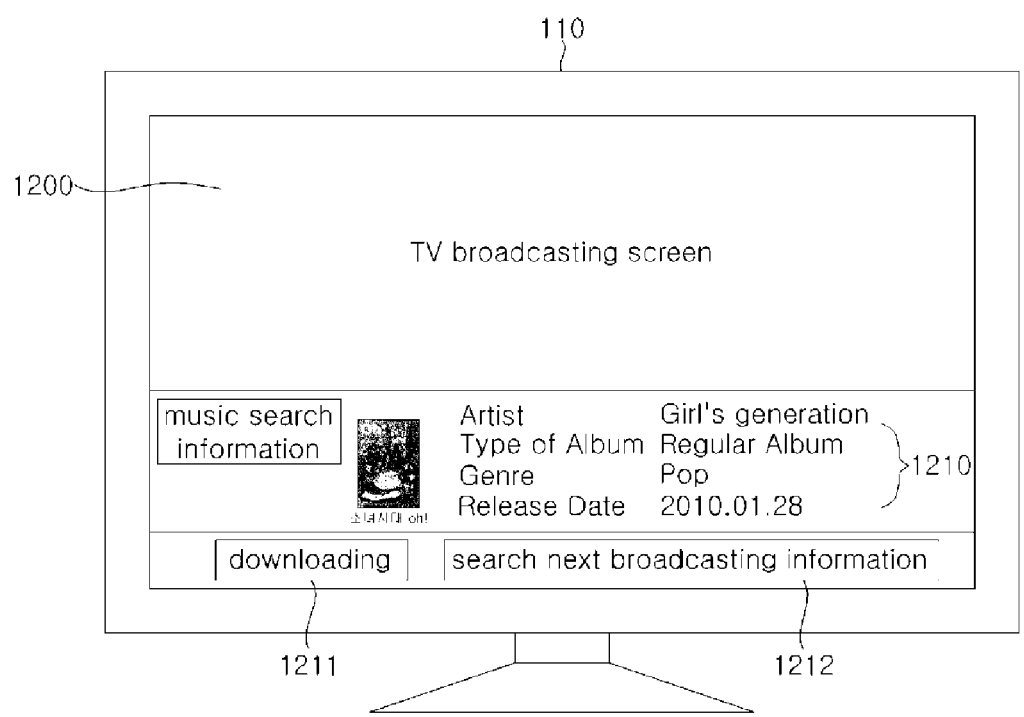
FIG. 12 is a diagram of the TV screen illustrating a music search result screen according to exemplary embodiments of the present invention.

When no search result information on the corresponding music is present, a message indicating that no searched result is present may be displayed (S610). On the other hand, when the search result information on the corresponding music is present, as the searched result, various types of music information may be displayed as illustrated in FIG. 12 (S611).

Figure 7:
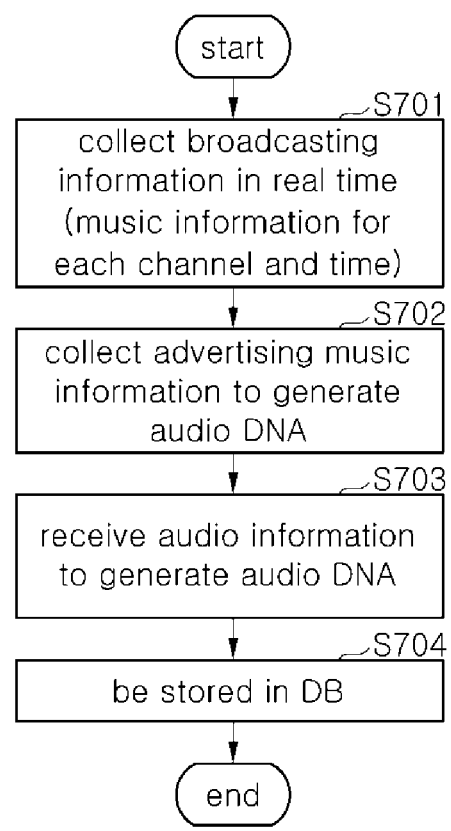
FIG. 7 is a flow chart illustrating a procedure of constructing a database of a music search server according to exemplary embodiments of the present invention.

FIG. 7 and FIG. 8 are diagrams illustrating a procedure performed in the music search server 130.

FIG. 7 is a flow chart illustrating a procedure of constructing a database of the music search server according to exemplary embodiments of the present invention. Referring to FIG. 7, the music search server may collect the broadcasting information in real time (S701). For example, the music search server may collect the music information for broadcasts according to time for each channel. That is, the time and title information on music inserted during the broadcasting through the specific channel, the advertising music information inserted during the advertising time between the broadcasting programs, and the like, may be collected from each broadcasting station server. In some embodiments, the music search server may collect the advertising music information and generate the audio DNA from the audio of each advertising music or advertisement (S702).

Further, the music search server collects the audio information of each music piece used in the broadcast and generates the audio DNA from the audio information (S703) and stores the generated audio DNA in the database (S704). The process of constructing a database as described above is performed periodically or aperiodically, such that the audio information and the broadcasting related information may be updated, accumulated, and stored.

FIG. 8 is a flow chart illustrating a procedure of providing music related information of the music search server according to exemplary embodiments of the present invention. Referring to FIG. 8, when the database is constructed as illustrated in FIG. 7, the information request for music being broadcasted may be received from the specific smart TV (S801). As such, it is possible to selectively confirm or discern the broadcasting information in the received information transmitted from the smart TV (S802).

The broadcasting programming information stored in the database is inquired from the confirmed broadcasting information (for example, channel information and time information) and when no music information corresponding to the received broadcasting information is present, the music information is inquired by searching the audio DNA information for each music piece (S811). As the result of inquiring the audio DNA information, when the searched result is present, the music information related to the corresponding searched music is inquired according to the searched result (S808). Further, the target advertisement is selectively searched according to the searched music (S809) and the searched result information is transmitted to the corresponding smart TV (S810).

When the music information corresponding to the received broadcasting information is present (S803) and when the corresponding broadcasting time is the advertising time (S804), the DNA information on the advertising music is searched based on the received is audio DNA (S805). However, when the music information corresponding to the received broadcasting information is present (S803) and when the corresponding broadcasting time is not the advertising time (S804) (for example, when drama, entertainment, and the like, are being broadcasted), the music is searched based on the received broadcasting information. As the inquiry result by the above-mentioned method, when no searched music is present, the music is searched by comparing the audio DNA information for the music (S811).

As such, when the corresponding music is searched by various methods, the music related information (for example, metadata, and the like) is inquired according to the searched result (S808) and the target advertisement is searched (S809) and is transmitted to the corresponding smart TV (S810).

The procedure of providing music related information by recognition of music output through the TV according to the exemplary embodiments of the present invention is described as described above. An example of services implemented according to the exemplary embodiments of the present invention will be described below.

EXAMPLE

Figure 9:
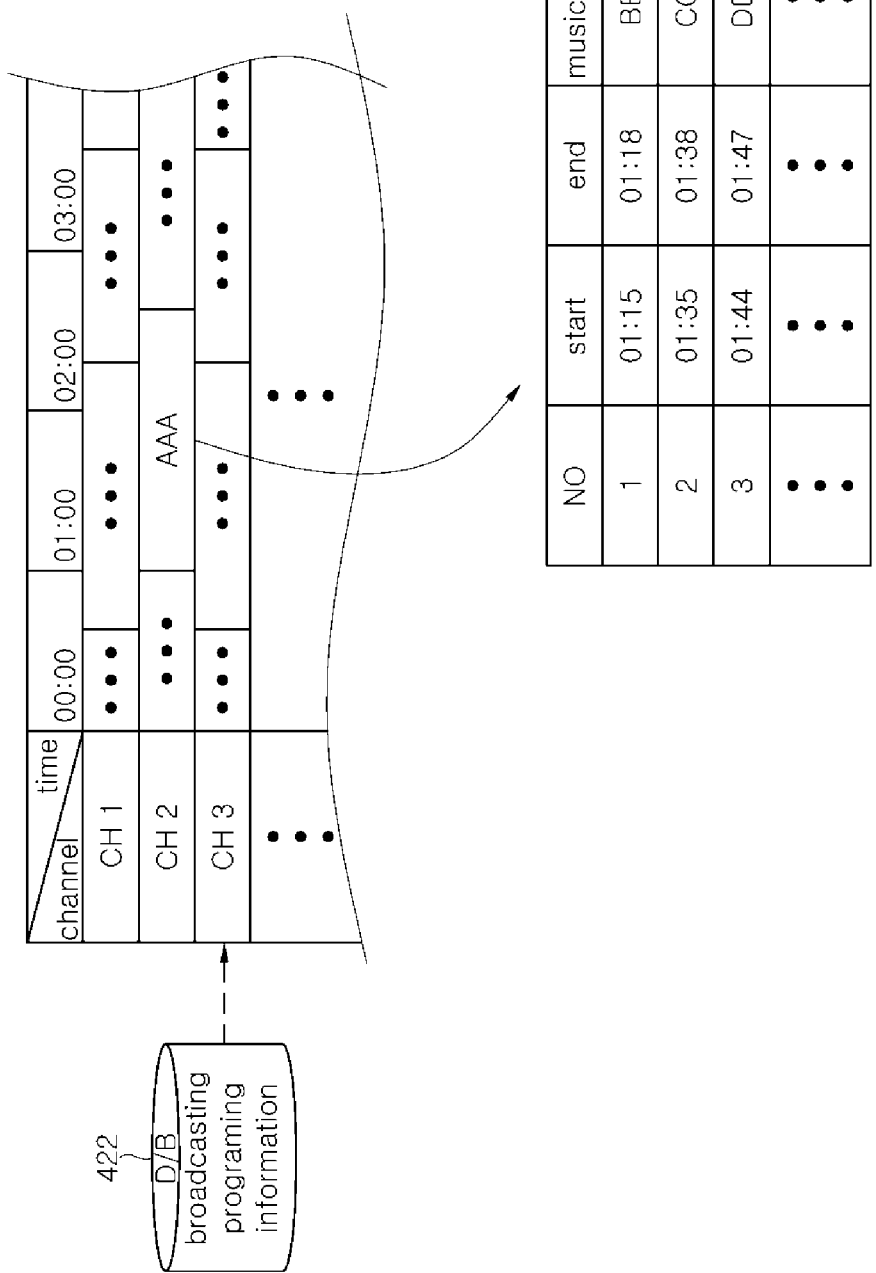
FIG. 9 is a diagram illustrating a data structure of a broadcasting programming information database according to exemplary embodiments of the present invention.

FIG. 9 is a diagram illustrating a data structure of a broadcasting programming information database according to exemplary embodiments of the present invention. Referring to FIG. 9, the broadcasting time information for each channel and the music information included in each broadcast may be stored in the broadcasting programming information database 422.

For example, when the information stored in the broadcasting programming information database 422 is confirmed, as illustrated, it can be appreciated that 'AAA' is broadcasted from 1 to 2:20 through 'CH2' and the information for music is inserted during the corresponding broadcasting. For example, it can be appreciated that music called 'BBB' is inserted and played from 1:15 to 1:18, music called 'CCC' is inserted and played from 1:35 to 1:38, and music called 'DDD' is inserted and played from 1:44 to 1:47.

Therefore, if the broadcasting channel information and the current time information are transmitted to the music search server from the smart TV, when the music information is included in the corresponding broadcasting programming information as illustrated, it is possible to search the music information without performing the audio DNA search.

For example, when the user issues the search request to search music outgoing from the 'AAA' broadcast through the current 'CH 2' at 1:37, the 1:37 and the 'CH 2' information are transmitted to the music search server, and it can be appreciated that the music which is currently being broadcasted is the 'CCC' by searching the broadcasting programming information database 422 based on the transmitted information.

Figure 10:
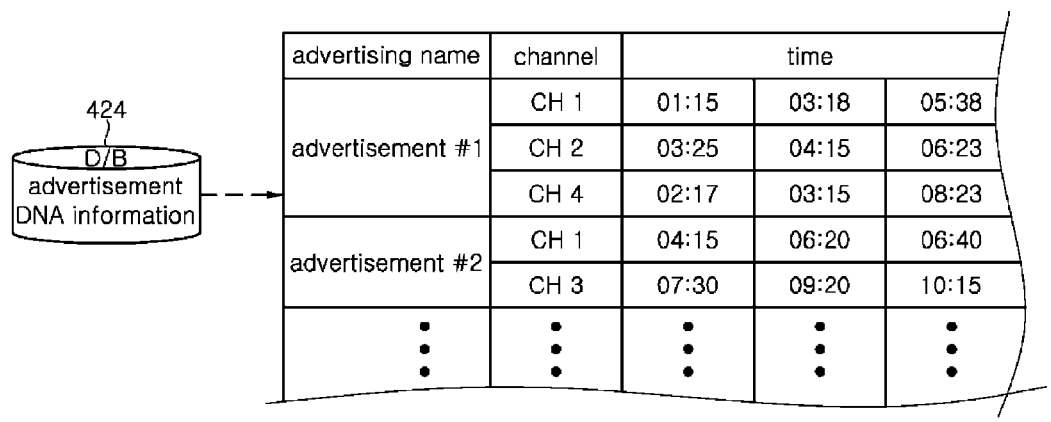
FIG. 10 is a diagram illustrating a data structure of an advertising DNA information database according to exemplary embodiments of the present invention.

FIG. 10 is a diagram illustrating a data structure of an advertising DNA information database according to exemplary embodiments of the present invention. As described above, the data generating the audio for each advertising music piece as the audio DNA may be stored in the advertising DNA information database 424 and in addition, as illustrated in FIG. 10, the schedule information on which each advertisement is broadcasted may be further stored.

For example, it can be appreciated that advertising #1 is broadcasted through the 'CH 1', like '01:15', '03:18', '05:38', and the like, broadcasted through the 'CH 2', like '03:25', '04:15', '06:23', and the like, and broadcasted through 'CH 4', like '02:17', '03:15', '08:23', and the like.

Figure 13:
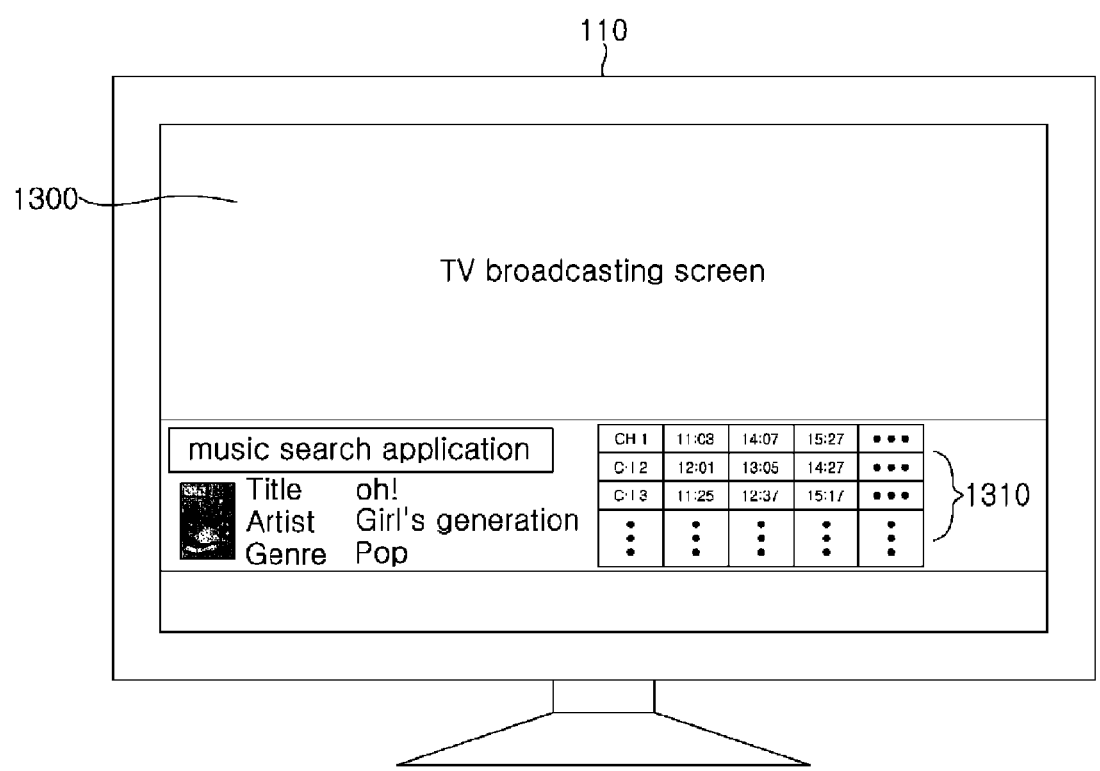
FIG. 13 is a diagram of the TV screen illustrating a broadcasting schedule inquiring result screen according to exemplary embodiments of the present invention.

Therefore, the specific advertising music is searched as the music being currently broadcasted and when the user searches the broadcasting schedule for the corresponding searched music, as described above, the broadcasting schedule information on the corresponding searched advertising music may be provided as illustrated in FIG. 13 by storing the schedule information on which each advertisement is broadcasted.

FIG. 11 is a diagram of a TV screen illustrating a music search application executing screen according to exemplary embodiments of the present invention. FIG. 12 is a diagram of the TV screen illustrating a music search result screen according to exemplary embodiments of the present invention.

Referring to FIG. 11 and FIG. 12, as described above, when the smart TV 110 executes a music search application 1110, the message inquiring whether to search the currently outgoing music information may be displayed. In this case, when the user selects a search button 1111 using an input device, such as, a remote controller, and the like, the information search for the music currently being broadcasted is performed and when a cancel button 1112 is selected, the application may end.

Therefore, according to the search request, music search result information 1210 may be displayed as illustrated in FIG. 12 and a target advertisement 1220 related thereto may be displayed together. When downloading 1211 is selected on the screen of FIG. 12, the screen may be switched to a settlement screen for downloading the corresponding searched music. Further, when a next broadcasting information search 1212 is selected on the screen of FIG. 12, the broadcasting schedule for the searched music as illustrated in FIG. 12 may be searched and displayed.

FIG. 13 is a diagram of the TV screen illustrating a broadcasting schedule inquiring result screen according to exemplary embodiments of the present invention. Referring to FIG. 13, when the broadcasting schedule information on searched music in FIG. 12 is requested, broadcasting schedule information 1310 for the corresponding music may be received and displayed through the database search of the music information server as described with reference to FIG. 10.

As described above, the present invention is described with reference to specific matters such as, the detailed components and the limited exemplary embodiments, but is provided to help a general understanding of the present invention. Therefore, the present invention is not limited to the above exemplary embodiments and can be variously changed and modified from the description by a person skilled in the art to which the present invention pertain.

Therefore, the spirit of the present invention should not be limited to the above-described exemplary embodiments and the following claims as well as all modified equally or equivalently to the claims are intended to fall within the scope and spirit of the invention.

What is claimed is:

1. A music search server comprising:
   a database configured to store music information and a broadcast time for broadcasting programs, music information and a broadcast time for advertisements, and audio DNA and detailed information of music pieces, the music information for the broadcasting program corresponding to music played at a plurality of time intervals during the broadcasting programs, the music information for the advertisements corresponding to advertisement music played during the advertisements;
   an information request receiver configured to receive at least one of audio DNA of currently broadcasted music and broadcasting information associated with the currently broadcasted music;
   an audio DNA searcher including,
      a broadcasting information inquiry device configured to identify the currently broadcasted music based on whether the received broadcasting information matches the music information played at the plurality of time intervals during the broadcasting programs and the broadcast time of one of the broadcasting programs stored in the database, an advertisement information inquiry device configured to identify the currently broadcasted music based on whether the received broadcasting information matches the music information and the broadcast time used for one of the advertisements stored in the database, and an audio information inquiry device configured to compare the received audio DNA with audio DNAs of the music pieces stored in the database to identify the currently broadcasted music;

a music information inquiry device configured to locate detailed information on the music identified by the audio DNA searcher; and a result information transmitter configured to transmit the detailed information, the detailed information including a target advertisement to be displayed, the target advertisement being based on the currently broadcasted music identified by the audio DNA searcher, the target advertisement includes at least one of specific information related to a specific user group and advertising information related to the currently broadcasted music, wherein the audio DNA searcher is configured to utilize the audio information inquiry device when the broadcasting information inquiry device and the advertisement information inquiry device fail to match the broadcasted music.

2. The music search server of claim 1, wherein the broadcasting information includes broadcast channel information and search request time information of the music information.

3. The music search server of claim 1, wherein the detailed information for the identified music comprises metadata including one or more of a music title, a musician name, an album name, a music list included in an album, a music genre, and an album picture.

4. The music search server of claim 1, wherein
the information request receiver is further configured to receive an audio signal, and
the audio information inquiry device is further configured to generate audio DNA from the received audio signal.

5. The music search server of claim 1, wherein
the information request receiver is further configured to receive the at least one of audio DNA of broadcasted music and broadcasting information from a smart Television (TV), the smart TV is configured to receive and display the detailed information.

6. The music search server of claim 1, wherein
the broadcasted music includes a currently broadcast music, and
the result information transmitter is further configured to transmit the detailed information in real-time.

7. A method for providing music related information by recognition of music by a music search server, the method comprising:
receiving an audio DNA and broadcasting information of currently broadcasted music for a plurality of broadcasting programs and advertisements, the broadcasting information for the plurality of broadcasting programs corresponding to music played during a plurality of time intervals during the plurality of broadcasting programs, and the broadcasting information for the advertisements corresponding to music played during the advertisements;
identifying, using the music search server, the currently broadcasted music by determining whether the received broadcasting information matches music information and broadcast time of one of the plurality of broadcasting programs or the advertisements, comparing, when the determining fails to match the broadcasted music, the received audio DNA with audio DNA of the music pieces to identify the broadcasted music;

searching detailed information on music identified by the audio DNA searcher; and transmitting the detailed information as a search result, the detailed information including a target advertisement to be displayed, the target advertisement being based on the identified currently broadcasted music, the target advertisement includes at least one of specific information related to a specific user group and advertising information related to the currently broadcasted music.

8. The method of claim 7, further comprising:
storing, in a database, the music information, the broadcast time of broadcasting programs, and the audio DNA and the detailed information for music pieces, the music information and the broadcast time used for advertisements.

9. The method of claim 7, wherein the broadcasting information includes broadcast channel information and search request time information of the music information.

10. The method of claim 7, wherein the detailed information for the identified music comprises metadata including one or more of a music title, a musician name, an album name, a music list included in an album, a music genre, and an album picture.

11. The method of claim 7, further comprising:
receiving an audio signal, and
generating audio DNA from the received audio signal.

12. The method of claim 7, further comprising:
receiving at least one of audio DNA of broadcasted music and broadcasting information from a smart television (TV);
transmitting the detailed information to the smart TV; and
displaying the detailed information on the smart TV.

13. The method of claim 7, wherein
the broadcasted music includes a currently broadcast music, and
the transmitting transmits the detailed information in real-time.

14. A non-transitory computer-readable storage medium having computer readable instructions stored thereon that, when executed by at least one processor, configure the at least one processors to perform a method for providing music related information by recognition of music by a music search server, the method comprising:
receiving an audio DNA and broadcasting information of currently broadcasted music for a plurality of broadcasting programs and advertisements, the broadcasting information for the plurality of broadcasting programs corresponding to music played during a plurality of time intervals during the plurality of broadcasting programs, and the broadcasting information for the advertisements corresponding to music played during the advertisements;
identifying, using the music search server, the currently broadcasted music by determining whether the received broadcasting information matches music information and broadcast time of one of the plurality of broadcasting programs or the advertisements, comparing, when the determining fails to match the broadcasted music, the received audio DNA with audio DNA of the music pieces to identify the broadcasted music;

searching detailed information on music identified by the audio DNA searcher; and transmitting the detailed information as a search result, the detailed information including a target advertisement to be displayed, the target advertisement configured to be based on the identified currently broadcasted music, the target advertisement includes at least one of specific information related to a specific user group and advertising information related to the currently broadcasted music.

* * * * *